UNITED STATES PATENT OFFICE.

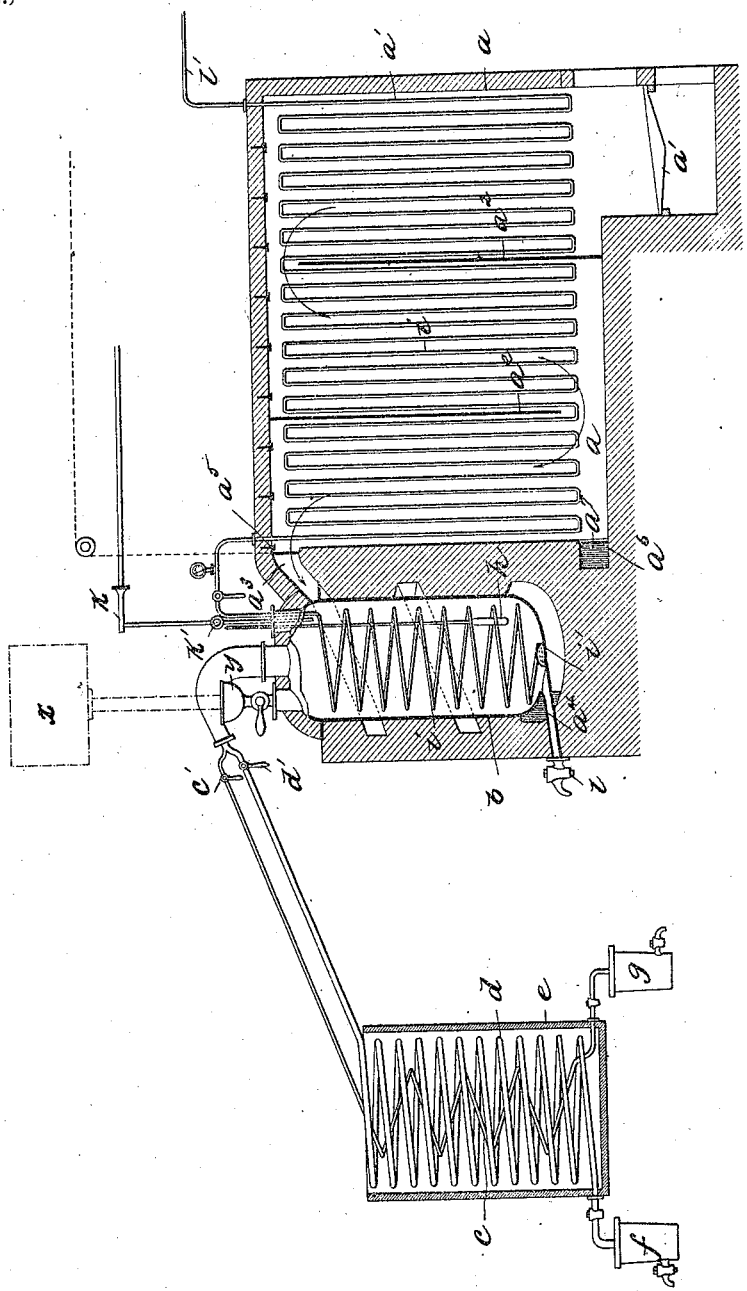

JEANNE DE DIESBACH, OF NEAR MONTDIDIER, FRANCE.

PROCESS OF RECOVERING GLYCERIN.

SPECIFICATION forming part of Letters Patent No. 631,396, dated August 22, 1899.

Application filed May 24, 1898. Serial No. 681,620. (No specimens.)

*To all whom it may concern:*

Be it known that I, JEANNE DE DIESBACH, (née JEANNE DE BEAUREPAIRE LOUVAGNY,) residing at the Chateau de Remaugies, near Montdidier, in the Department of the Somme, in the Republic of France, have invented certain new and useful Improvements in the Production or Extraction of Glycerin from Waste Products, of which the following is a specification.

The wash relating to the distillation of wine, grain, molasses, beet-root, and, speaking generally, from any alcoholic fermentation contains glycerin, which is formed during the alcoholic fermentation at the expense of the sugar. This glycerin, partly drawn over by the ebullition, is retained by the distilling-column or by the analyzing apparatus. It can therefore be recovered from these residues, in which it is lost under ordinary circumstances.

The object of this invention is to extract the glycerin from the wash or residue. By the term "wash" is meant residues of all kinds found in retorts or alembics after the process of distilling wines, grain, molasses, beet-root, or, in other words, the residues of any alcoholic fermentation.

The process consists, essentially, in first evaporating the wash to a suitable degree in a closed receptacle, so as to enable the salts to deposit, in subsequently neutralizing this evaporated wash or residue by means of a suitable chemical agent, and in finally causing superheated steam to pass into this concentrated wash at an appropriate temperature, so as to disaggregate the mass and to carry off the glycerin, which is condensed in a suitable apparatus provided for this purpose.

In order to carry the process into practice, the distiller's wash to be treated is so evaporated as to reduce the same to a suitable degree of concentration. This concentration is preferably effected in a closed vessel in order to enable the salts—such as tartrates, chlorids and sulfates of potassium, iron, aluminium, calcium, and phosphates of calcium—to deposit. This deposition of the salts is advantageous, because by ridding the wash thereof the chances of injurious combinations occurring in the subsequent treatment are far less and the quantity of glycerin obtained is greater.

The degree of concentration of the wash of course varies, but is preferably effected by subjecting the wash to a heat not greater than 70° centigrade, and the concentration preferably should not be carried further than to evaporate nine-tenths of the water in order that the formation of acrolein by the dehydration of the glycerin will be prevented.

Some washes, such as those of molasses and beet-root, contain free acids, such as strong sulfuric or chlorhydric acids, which are purposely added to them during distillation in order to saccharify the grain or intervert the sugar of the molasses. These free acids when not combined with a base to form salts would decompose the glycerin at the distilling-temperature. It is therefore important to neutralize them, and in order to effect this the concentrated wash after it has been partly freed from its salts is treated by a suitable neutralizing agent, lime, either in powder or milk of lime, being preferably employed for the purpose. The quantity of lime employed naturally varies and depends upon the quantity of free acids in the wash which it is necessary to fix. The lime salts, such as sulfates and tartrates, are precipitated and gathered with the excess of lime, if any, at the bottom of the tanks, the liquid extracted from the salts and lime being added to the mass to be subsequently distilled and the lime and salts forming by-products.

The third operation consists in treating the concentrated wash after it has been freed from the greater part of its salts and after its neutralization with superheated steam, which must be of a suitable temperature in order that the glycerin may be vaporized without being, however, decomposed. For this latter operation a separating apparatus may be used of the kind, for example, which are at the present time employed in stearin or soap works for the distillation of the raw glycerin. Finally, the condensed glycerin collected in the condenser is purified by any suitable means, according to the impurities contained therein, which are dependent upon the varying nature of the wash treated and upon the degree of purity desired to be obtained.

In the accompanying drawing the figure illustrates, diagrammatically, one form of apparatus for carrying out the improved process.

As shown, the apparatus is composed of a furnace $a$, a retort $b$, two coils $c$ and $d$, surrounded by a tank $e$, and two closed receiving vessels $f$ and $g$. The hot gases produced by combustion leave the hearth $a'$, and following the direction of the arrows on account of the baffle-plates $a^2$ enter the flue $a^3$, running spirally around the retort $b$, and escape by the chimney-opening $a^4$. When the temperature in the retort is sufficiently high, which can be seen by the thermometer $h$ dipping into it, the damper $a^5$ is closed and $a^6$ opened, so that the hot gases escape by the opening $a^7$.

Tubes $i$, containing steam to be superheated, are placed in the furnace in such a way as to give the greatest possible heating-surface. The tubes are all united and the end one passes into the retort, where after forming a coil it finishes in a rose $i'$, placed at the bottom of the retort. This rose has only holes at the sides, which allow the superheated steam to penetrate the mass contained in the retort, carrying with it the ammonia and glycerin. The ammonia being much more volatile than the glycerin passes by the upper tube $c$, the tap $d'$ being closed. This tube $c$ descends to the tank $e$, filled with cold water, and passing through it in a coil conducts the ammonia into the closed vessel $g$. When all the ammonia is extracted, the glycerin begins to be carried along by the superheated steam. The tap $c'$ is then closed and $d'$ opened. The glycerin descends by the pipe $d$, which passes in a coil through the tank filled with cold water and conducts it to the closed vessel $f$.

The retort is put into communication with an ejector $k$ by means of a tube provided with a vacuum-gage $k'$. The residues or washes are contained in a vessel $x$ and are introduced into the retort by the funnel $y$, closed by a valve $y'$. The retort has also a blow-off cock $l$. The superheated steam-supply pipe has a pressure-gage and tap.

Having now particularly described and ascertained the nature of my said invention and in what manner the same is to be performed, what I claim is—

The process of extracting glycerin from a wash containing the same which consists in concentrating the wash by evaporation, in treating the concentrated wash with an agent to neutralize the free acids contained therein, then subjecting the wash thus treated to the action of steam to carry off the glycerin contained therein, and finally condensing the glycerin, substantially as described.

In testimony whereof I have signed my name to this specification in the presence of two subscribing witnesses.

JEANNE DE DIESBACH, NÉE JEANNE
                DE BEAUREPAIRE LOUVAGNY.

Witnesses:
  EDWARD P. MACLEAN,
  JOHN A. NILES.